(12) United States Patent
Shang et al.

(10) Patent No.: US 12,291,841 B2
(45) Date of Patent: May 6, 2025

(54) FULL-HYDRAULIC AUTOMATIC DIAPHRAGM WALL CUTTING-GROOVING MACHINE

(71) Applicant: SHENZHEN SUNHUI MACHINERY CO., LTD., Guangdong (CN)

(72) Inventors: Zengdi Shang, Guangdong (CN); Huijian Cai, Guangdong (CN); Zhen Shang, Guangdong (CN); Bin Lei, Guangdong (CN); Gende Shan, Guangdong (CN)

(73) Assignee: SHENZHEN SUNHUI MACHINERY CO., LTD., Guangdong (CN)

( * ) Notice: Subject to any disclaimer, the term of this patent is extended or adjusted under 35 U.S.C. 154(b) by 746 days.

(21) Appl. No.: 17/608,737

(22) PCT Filed: Oct. 29, 2020

(86) PCT No.: PCT/CN2020/124617
§ 371 (c)(1),
(2) Date: Nov. 3, 2021

(87) PCT Pub. No.: WO2022/062054
PCT Pub. Date: Mar. 31, 2022

(65) Prior Publication Data
US 2022/0372729 A1    Nov. 24, 2022

(30) Foreign Application Priority Data

Sep. 28, 2020   (CN) .......................... 202011040931.6

(51) Int. Cl.
*E02F 5/08*   (2006.01)
*E02F 3/20*   (2006.01)
(Continued)

(52) U.S. Cl.
CPC ................ *E02F 5/08* (2013.01); *E02F 5/145* (2013.01); *G01B 21/22* (2013.01); *G01B 21/30* (2013.01)

(58) Field of Classification Search
CPC ... E02F 5/08; E02F 5/145; E02F 3/205; E02F 9/226; E02F 9/2232; E02F 9/2292;
(Continued)

(56) References Cited

U.S. PATENT DOCUMENTS 8,640,364 B2 *   2/2014   Arzberger ............... E02D 17/13
                                                     37/189
10,669,689 B2 *   6/2020   Gillard .................... E02F 3/241
2018/0305885 A1*  10/2018  Cascarino ............... E02D 17/04

* cited by examiner

*Primary Examiner* — Thomas B Will
*Assistant Examiner* — Robert E Pezzuto
(74) *Attorney, Agent, or Firm* — Rhodes IP PLC; Christopher R Rhodes

(57) ABSTRACT

A full-hydraulic automatic diaphragm wall cutting-grooving machine includes a supporting frame, a cutting device, a cutting driving device and a verticality detection device. The verticality detection device is used to detect the verticality and flatness of the diaphragm wall during the cutting process, the cutting device is used to drive the supporting frame and an equipment arranged on the supporting frame to move and cut, the cutting driving device is used to drive and adjust the cutting device in different directions. The verticality detection device is used to realize the automatic measurement of the verticality of the wall and the bottom surface and the flatness of the wall during the cutting process.

11 Claims, 9 Drawing Sheets

(51) Int. Cl.
*E02F 5/14* (2006.01)
*G01B 21/22* (2006.01)
*G01B 21/30* (2006.01)

(58) Field of Classification Search
CPC ..... E02F 9/2029; E02F 9/2041; E02F 9/2045;
E02F 3/20; E02F 3/241; E02F 3/245;
E21B 7/02; G01B 21/22; G01B 21/30
See application file for complete search history.

FULL-HYDRAULIC AUTOMATIC DIAPHRAGM WALL CUTTING-GROOVING MACHINE

CROSS REFERENCE TO RELATED APPLICATIONS

This application is a 35 U.S.C. § 371 U.S. national phase entry of International Application No. PCT/CN2020/124617 having an international filing date of Oct. 29, 2020, which claims the benefit of Chinese Application No. 202011040931.6 filed Sep. 28, 2020, each of which is incorporated herein by reference in its entirety.

TECHNICAL FIELD

The disclosure relates to a cutting machine, and more particularly, to a full-hydraulic automatic diaphragm wall cutting-grooving machine.

BACKGROUND

The cutting-grooving machine is mainly for cutting between the bottom surface and the wall in the vertical state of the diaphragm wall, so that the wall and the ground form the required structure. When cutting the wall and bottom surface of the diaphragm wall, it is necessary to make an adjustment for the cavity and bottom surface of different depths and different positions, however, the cutting device in the existing technology usually only has one cutting tool and the drive of the cutting tool, and the cutting position and depth are manually adjusted after manual surveying during the cutting process. This cutting device has the following disadvantages: the cutting process being troublesome, the cutting efficiency being low, the cutting quality being low, and a large amount of labor costs being consumed, thus while the cost is increased, it is also prone to dangerous accidents, which may cause danger to human lives.

SUMMARY

In order to overcome the shortcomings of the existing technology, the present disclosure provides a full-hydraulic automatic diaphragm wall cutting-grooving machine, which is provided with an automatic cutting driving device to drive a cutting device, and a verticality detection device, thereby realizing the automatic measurement of the cutting position and the automatic adjustment of the cutting direction, position and depth of the cutting device during the cutting process.

The technical solutions adopted by the present disclosure to solve its technical problems are:

A full-hydraulic automatic diaphragm wall cutting-grooving machine, which includes a supporting frame, a cutting device, a cutting driving device and a verticality detection device; the verticality detection device is arranged on a side of the supporting frame, and is used to detect the verticality and flatness of the diaphragm wall during the cutting process, the cutting device is arranged at a bottom of the supporting frame and is used to drive the supporting frame and an equipment arranged on the supporting frame to move and cut, the cutting driving device is arranged on the cutting device and is used to drive and adjust the cutting device in different directions.

As an improvement of the above technical solution, the supporting frame includes a top supporting plate, and a horizontal support and a vertical support arranged below the top supporting plate, and the frame enclosed by the vertical support and the horizontal support is hollow; the vertical supports are located at four corners of the supporting frame, and the horizontal support and the vertical support are arranged perpendicular to each other, the horizontal support comprises three rows of plates, the three rows of plates refer to end horizontal supporting plates arranged at two ends of the vertical support and a middle horizontal supporting plate arranged at a middle position of the vertical support, the end horizontal supporting plates and the middle horizontal supporting plate are arranged in parallel.

As an improvement of the above technical solution, both the horizontal support and the vertical support are set in two layers, and the vertical support includes an external mounting plate and an internal fixing plate, the external mounting plate and the internal fixing plate are arranged in parallel, and the external mounting plate is used to install the verticality detection device, the internal fixing plate is used for auxiliary fixing, four external mounting plates and four internal fixing plates are provided, and the four external mounting plates and the four internal fixing plates are vertically arranged at a bottom of the top supporting plate.

As an improvement of the above technical solution, the top supporting plate includes an edge part arranged on the horizontal support and a central part arranged in the middle of the edge part; wherein, the top supporting plate is further provided with a frame connection component, and a top mounting block is located in the middle of the central part, a mounting screw is further arranged in the top mounting block, and the mounting screw is vertically arranged on the top mounting block.

As an improvement of the above technical solution, the cutting driving device includes a horizontal driving device and a vertical driving device, the cutting device is arranged on the horizontal driving device and is driven by the horizontal driving device, and the horizontal driving device is arranged on the vertical driving device and is driven by the vertical driving device.

As an improvement of the above technical solution, the vertical driving device includes a vertical mounting frame, a vertical driving oil cylinder, a vertical sliding rail and a vertical sliding block, the vertical driving oil cylinder and the vertical mounting frame are both mounted at the bottom of the supporting frame; the vertical sliding rail is arranged on the mounting frame, and the vertical sliding block is slidably arranged in a pushing direction of the vertical oil cylinder in cooperation with the vertical sliding rail; the horizontal driving device is fixedly arranged on an end of an oil rod of the vertical driving oil cylinder and the vertical sliding block.

As an improvement of the above technical solution, the vertical driving device includes a vertical driving oil cylinder, a vertical sliding rail and a vertical sliding block, the vertical sliding rail includes two vertical sliding rails, and the two vertical sliding rails are respectively arranged on the middle horizontal supporting plates on both sides of the supporting frame, the vertical sliding block is located in the middle of the two vertical sliding rails and is slidably arranged along the vertical sliding rails; the vertical driving oil cylinder is arranged on the top supporting plate of the supporting frame, and the end of the oil rod of the vertical driving oil cylinder is fixedly connected with the top of the vertical sliding block, the horizontal driving device is arranged at the bottom of the vertical driving sliding block.

As an improvement of the above technical solution, the horizontal driving device includes a horizontal mounting frame, a horizontal driving oil cylinder, a horizontal driving sliding rail and a horizontal driving block, the horizontal mounting frame is fixed at a bottom of the vertical driving device, and the horizontal driving sliding rails are located on both sides of the horizontal mounting frame, the horizontal driving oil cylinder is arranged in the middle of the horizontal mounting frame, the horizontal driving sliding block is fixed on the oil rod of the horizontal driving oil cylinder while being clamped on two horizontal driving sliding rails, and is arranged to slide in cooperation with the two horizontal driving sliding rails, and the cutting device is fixed on the horizontal driving sliding block; or, the horizontal driving device includes a horizontal mounting frame, a horizontal driving motor, a horizontal driving gear, a horizontal driving rack, a horizontal driving sliding rail and a horizontal driving block, the horizontal mounting frame is fixed at the bottom of the vertical driving device, the horizontal driving sliding rails are located on both sides of the horizontal mounting frame, and the horizontal driving rack is arranged in the middle of the horizontal mounting frame, the horizontal driving motor is vertically fixed on the horizontal sliding block, and the horizontal driving gear is arranged on a motor shaft of the horizontal driving motor, the horizontal driving gear meshes with the horizontal driving rack, the horizontal driving sliding block is clamped on two horizontal driving sliding rails, and is slidably arranged in cooperation with the two horizontal driving sliding rails, and the cutting device is fixed on the horizontal driving sliding block.

As an improvement of the above technical solution, the cutting device includes a cutting tool, a tool mounting frame and a cutting driving motor, the tool mounting frame is fixed on the horizontal driving sliding block, and the cutting tool is rotatably arranged on the tool mounting frame through a tool mounting shaft, the cutting driving motor drives the tool mounting shaft to rotate on the tool mounting frame; a plurality of the cutting tools are provided.

As an improvement of the above technical solution, the verticality detection device includes a verticality detection component and a sensor, the verticality detection component and the sensor are both arranged on the vertical support of the supporting frame, a plurality of the verticality detection components are provided and movably mounted on sides of four vertical supports of the supporting frame.

As an improvement of the above technical solution, the verticality detection component includes an adjustment detection support and an auxiliary detection support, two adjustment detection supports are provided on each column of verticality detection components, the two adjustment detection supports are respectively located at an upper end and a lower end of the supporting frame, and auxiliary support devices for auxiliary are provided on both sides of the adjustment detection support; wherein, the auxiliary detection support includes an auxiliary detection board, a sliding shaft and a movable mounting shaft, and the auxiliary detection board is mounted on the supporting frame through the sliding shaft and the movable mounting shaft; the adjustment support includes an adjustment detection board, a sliding shaft and an oil cylinder, and the adjustment detection board is arranged on the supporting frame through the oil cylinder and the sliding shaft.

As an improvement of the above technical solution, the movable mounting shaft is located in the middle of the auxiliary detection board and is used for fixing the middle of the auxiliary detection board, and the sliding shaft located at two ends of the auxiliary detection board are used for the sliding support at the two ends of the auxiliary detection board; the oil cylinder is located in the middle of the adjustment detection board and is used to adjust the mounting distance between the adjustment detection board and the supporting frame, and the sliding shafts located at two ends of the adjustment detection board are used for the sliding support at both ends of the adjustment detection board; the sensor is located on the sliding shaft and is used for sensing the sliding distance of the auxiliary detection board or the adjustment detection board on the respective sliding shaft.

The beneficial effects of the present disclosure are: the diaphragm wall cutting machine of the present disclosure is provided with a cutting driving device and a verticality detection device on the cutting device, the verticality detection device is used to realize the automatic measurement of the verticality of the wall and the bottom surface and the flatness of the wall during the cutting process. Combined with the measurement data, the cutting device is controlled by the cutting driving device to realize the automatic measurement of the cutting position during the cutting process and the automatic adjustment of the cutting direction, position and depth of the cutting device, thereby realizing the automatic, high-efficiency, high-precision diaphragm wall cutting process.

BRIEF DESCRIPTION OF THE DRAWINGS

The present disclosure will be further described below in conjunction with the drawings and embodiments.

1. horizontal driving device;
11. horizontal mounting frame;
12. horizontal driving oil cylinder;
13. horizontal driving sliding rail;
14. horizontal driving sliding block;
15. horizontal driving motor;
16. horizontal driving rack;

2. vertical driving device;
21. vertical mounting frame;
22. vertical driving oil cylinder;
23. vertical sliding rail;
24. vertical sliding block;
3. verticality detection device;
31. auxiliary detection board;
32. sliding shaft;
33. movable mounting shaft;
34. adjustment detection board;
35. detection oil cylinder;
36. sensor;
4. supporting frame;
41. top supporting plate;
42. horizontal support;
43. vertical support;
44. frame connection component;
45. top mounting block;
46. mounting screw;
5. cutting device;
51. cutting tool;
52. tool mounting frame;
53. cutting driving motor.

DETAILED DESCRIPTION

In the following, the concept, specific structure and technical effects of the present disclosure will be clearly and completely described in conjunction with the embodiments and the drawings, so as to fully understand the purpose, features and effects of the present disclosure. Apparently, the described embodiments are only a part of the embodiments of the present disclosure, rather than all the embodiments. Based on the embodiments of the present disclosure, other embodiments obtained by those skilled in the art without creative work shall fall within the protection scope of the present disclosure. In addition, all the coupling/connection relationships involved in the disclosure do not only refer to the direct connection of the components, but refer to the fact that a better connection structure can be formed by adding or reducing connection accessories according to specific implementation conditions. The various technical features in the disclosure can be combined interactively under the premise of not conflicting with each other.

Figure 1:
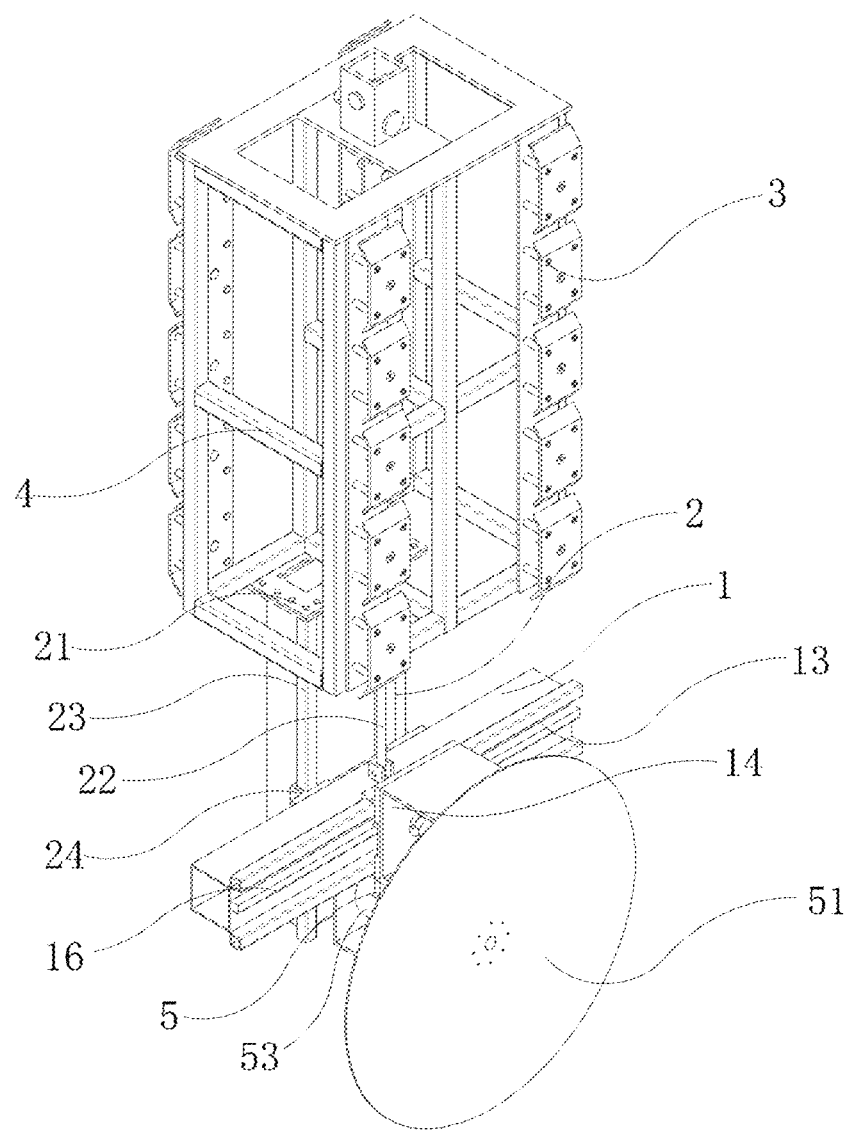
FIG. 1 is a schematic diagram of a first type of vertical driving device and the overall assembly of the present disclosure.
Figure 2:
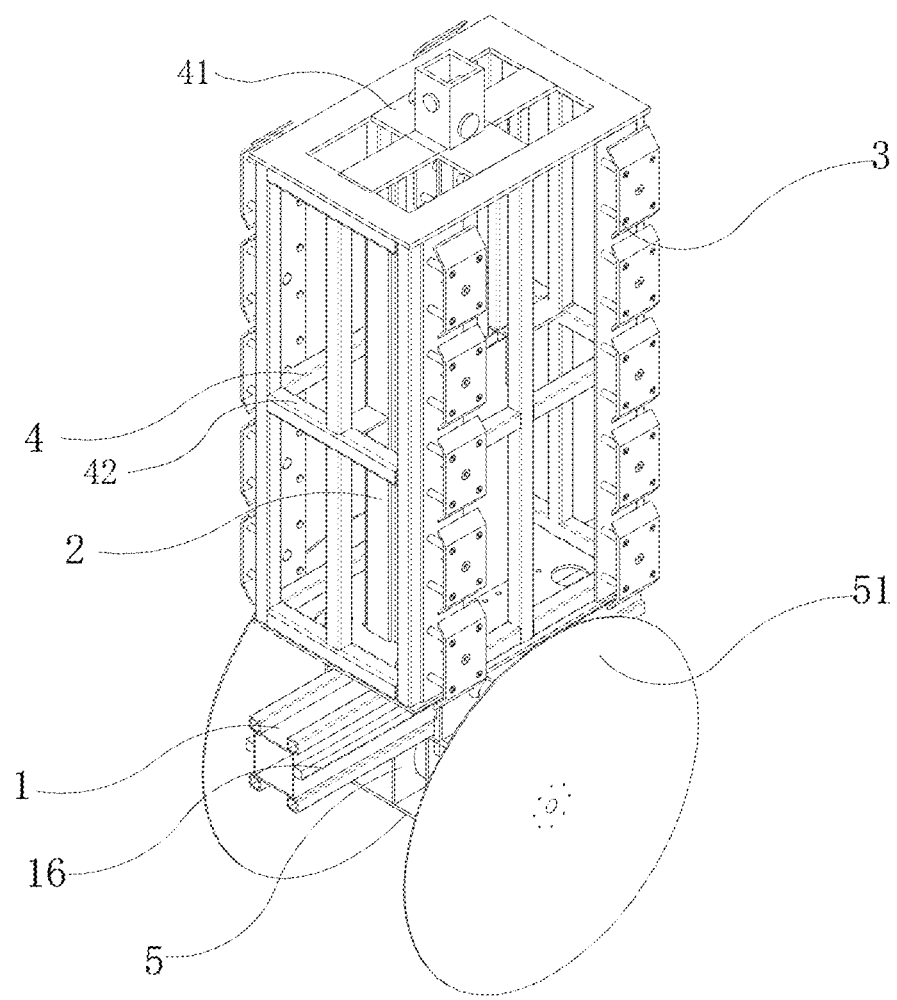
FIG. 2 is a schematic diagram of a second type of vertical driving device and the overall assembly of the present disclosure.

Referring to FIG. 1 and FIG. 2, based to the cutting machine in the existing technology with only one cutting tool 51 and a cutting drive, a full-hydraulic automatic diaphragm wall cutting-grooving machine is provided, which includes a supporting frame 4, a cutting device 5, a cutting driving device and a verticality detection device 3; the verticality detection device 3 is arranged on a side of the supporting frame 4, and is used to detect the verticality and flatness of the diaphragm wall during the cutting process, the cutting device 5 is arranged at a bottom of the supporting frame 4 and is used to drive the supporting frame 4 and an equipment arranged on the supporting frame 4 to move and cut, the cutting driving device is arranged on the cutting device 5 and is used to drive and adjust the cutting device 5 in different directions. The full-hydraulic automatic diaphragm wall cutting-grooving machine uses the supporting frame 4 to integrate the cutting device 5, the cutting driving device and the verticality detection device 3 into a whole, and then connect them through the control circuit, so that the detection of verticality and flatness and the automatic adjustment process of the cutting direction, position and depth of the cutting device 5 by the cutting driving device according to the data are realized. While completing the automation of the cutting process, it also improves the cutting efficiency and increases the cutting accuracy.

Figure 7:
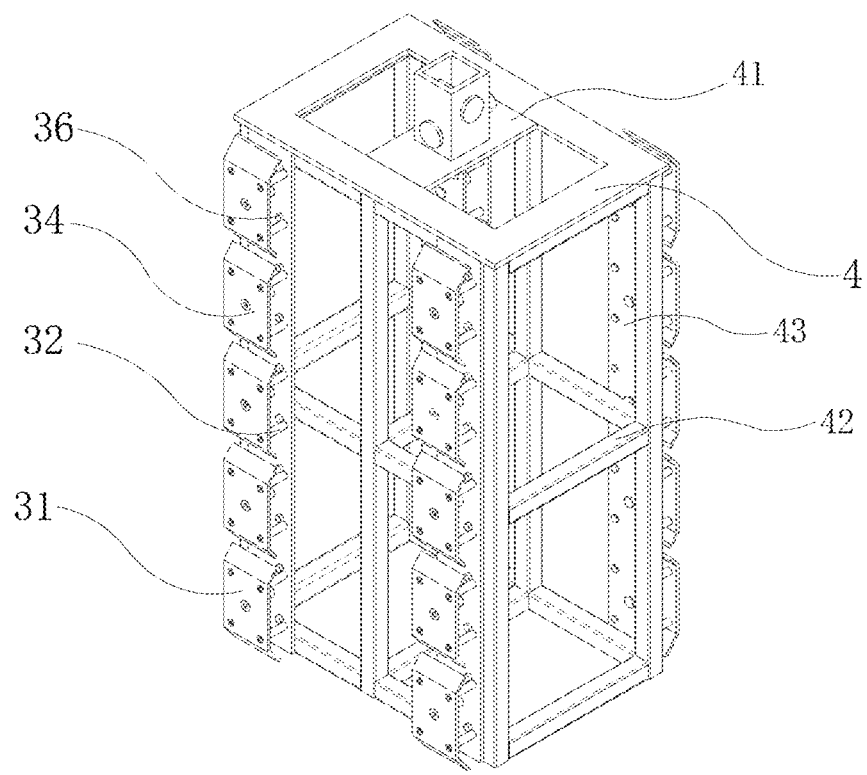
FIG. 7 is a structural schematic diagram of a first type of supporting frame and a verticality detection device of the present disclosure.

Referring to FIG. 7 the supporting frame 4 includes a top supporting plate 41, and a horizontal support 42 and a vertical support 43 arranged below the top supporting plate 41, both the horizontal support 42 and the vertical support 43 are set as a single layer, and a frame enclosed by the vertical support 43 and the horizontal support 42 is hollow; the vertical supports 43 are located at the four corners of the supporting frame 4, and the horizontal supports 42 and the vertical supports 43 are arranged perpendicularly. The four vertical supports 43 arranged at the four corners below the top supporting plate 41 fix the distance between the bottom support and the top support. The horizontal support 42 comprises three rows of plates, the three rows of plates refer to end horizontal supporting plates arranged at two ends of the vertical support 43 and a middle horizontal supporting plate 42 arranged at a middle position of the vertical support 43, the end horizontal supporting plates and the middle horizontal supporting plate are arranged in parallel. Since the vertical support 43 is set to a longer length in the vertical direction of the cutting machine, the center of gravity of the top support is high, making the cutting machine as a whole not stable enough. Therefore, the arrangement of the horizontal support 42 plays an auxiliary support role for the vertical support 43, prevents the vertical support 43 from bending, enhances the supporting force of the vertical support 43, and further increases the overall stability of the cutting machine.

Figure 8:
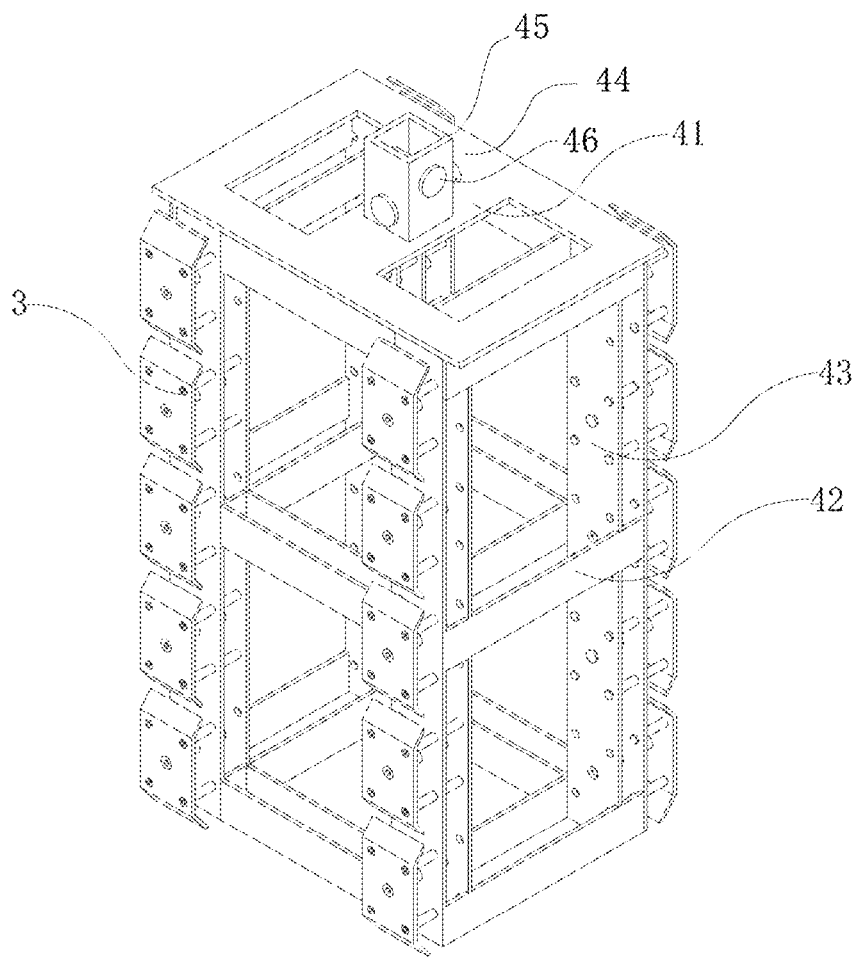
FIG. 8 is a structural schematic diagram of a second type of supporting frame and a verticality detection device of the present disclosure.

Referring to FIG. 8, in order to further increase the stability of the supporting frame 4 and improve the overall performance, on the basis of the original single-layer horizontal support 42 and vertical support 43, both the horizontal support 42 and the vertical support 43 are set in two layers. Compared with the simple supporting device in the existing technology, the horizontal support 42 and the vertical support 43 arranged in two layers can not only realize the mounting and combination of the various parts of the cutting-grooving machine, but also increase the stability during mounting and combination and the stability during use, improve the overall supporting performance of the supporting frame 4, and increase the service life. The vertical support 43 includes an external mounting plate and an internal fixing plate, the external mounting plate and the internal fixing plate are arranged in parallel, and the external mounting plate is used for the installment of the verticality detection device 3, the internal fixing plate is used for auxiliary fixing, the numbers of the external mounting plate and the internal fixing plate are both set to four, and the four external mounting plates and the four internal fixing plates are vertically arranged at a bottom of the top supporting plate 41. The external mounting plate and the internal fixing plate of the vertical support 43 are arranged in combination, which can not only realize the fixed support for the top supporting plate 41, but also mount the verticality detection device 3, compared with the single-layer plate mounting, the double-layer mounting plate for mounting the verticality detection device 3 increases the stability during mounting and use.

Both the single-layer supporting frame 4 and the double-layer supporting frame 4 are provided with a top supporting plate 41, the top supporting plate 41 includes an edge part arranged on the horizontal support 42 and a central part arranged in the middle of the edge part; wherein, the top supporting plate 41 is further provided with a frame connection component 44, and a top mounting block 45 is located in the middle of the central part, a mounting screw 46 is further arranged in the top mounting block 45, and the mounting screw is vertically arranged on the top mounting block. The bottom connecting component is matched with the top connecting component to connect the driving device and the cutting device 5 of the cutting machine, the horizontal support 42 and the vertical support 43 formed with hollow are also for facilitating the communication between the top connecting component and the bottom connecting component and facilitating the mounting of equipment.

Figure 3:
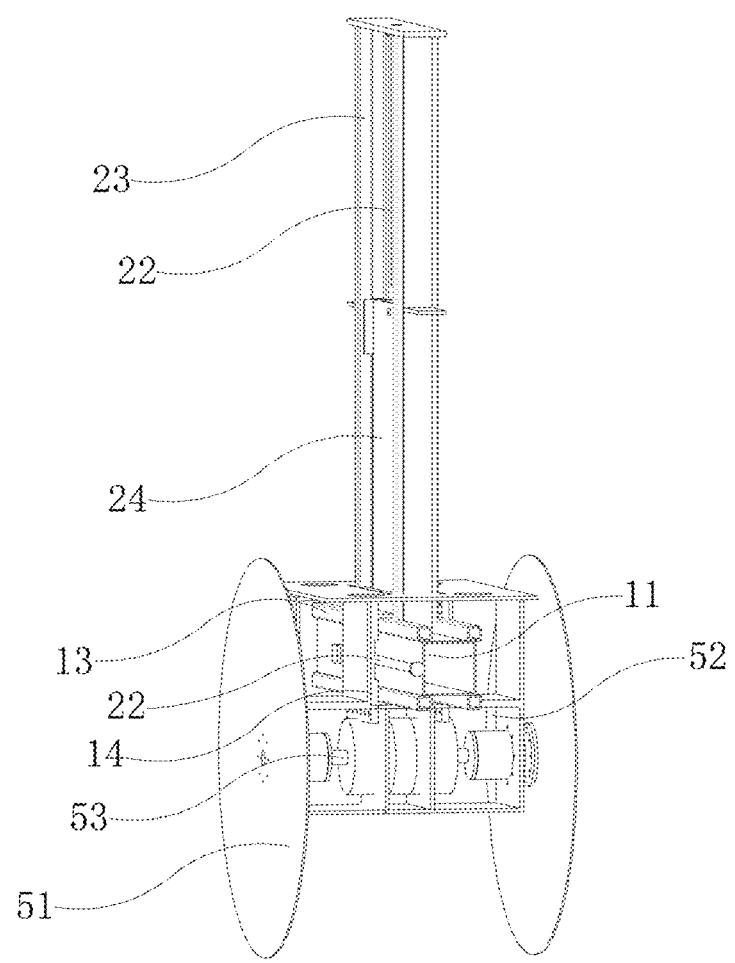
FIG. 3 is a structural schematic diagram of a first type of horizontal driving device and a first type of vertical driving device of the present disclosure.
Figure 5:
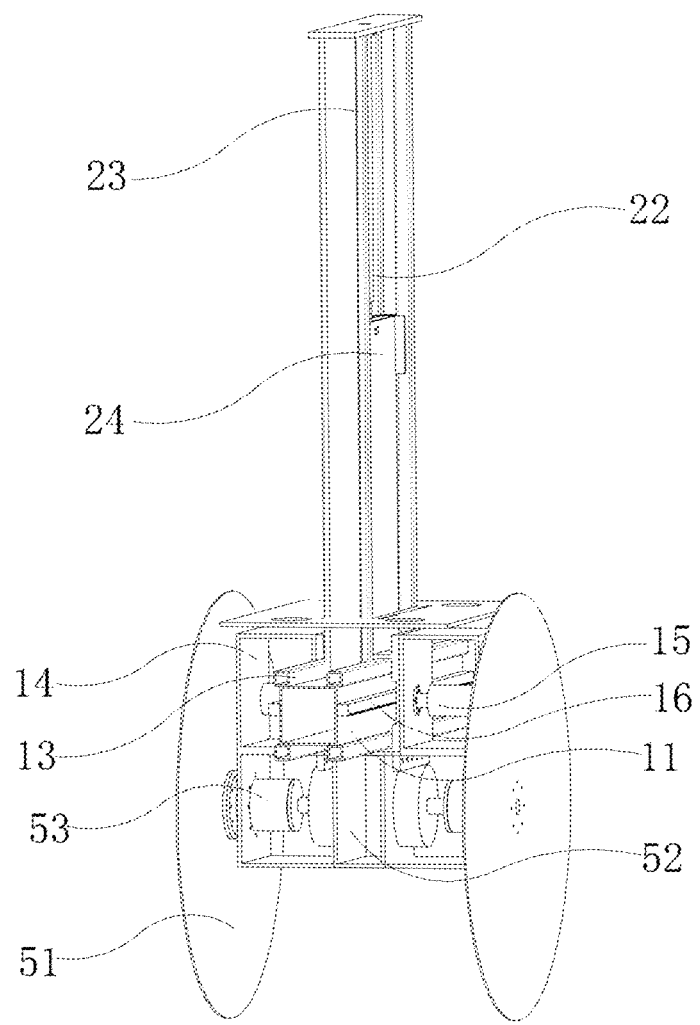
FIG. 5 is a schematic diagram of a second type of horizontal driving device and a first type of vertical driving device of the present disclosure.

Referring to FIG. 1, FIG. 3 and FIG. 5, a type of the vertical drive device 2 is shown, the cutting driving device includes a horizontal driving device 1 and a vertical driving device 2, the cutting device 5 is arranged on the horizontal driving device 1 and is driven by the horizontal driving device 1, and the horizontal driving device 1 is arranged on the vertical driving device 2 and is driven by the vertical driving device 2. The vertical driving device 2 includes a vertical mounting frame 21, a vertical driving oil cylinder 22, a vertical sliding rail 23 and a vertical sliding block 24, the vertical driving oil cylinder 22 and the vertical mounting frame 21 are both mounted at the bottom of the supporting frame 4; the vertical sliding rail 23 is arranged on the mounting frame, and the vertical sliding block 24 is slidably arranged on the vertical sliding rail 23 in a pushing direction of the vertical oil cylinder; the horizontal driving device 1 is fixedly arranged on an end of an oil rod of the vertical driving oil cylinder and the vertical sliding block 24. This type of mounting of the vertical driving device 2 and the supporting frame 4 of the equipment only has a connection surface on the top of the vertical mounting frame 21, the structural requirements for the connection are relatively low, and the mounting is convenient, and it can be adapted to different equipment and different supporting frames 4.

Figure 4:
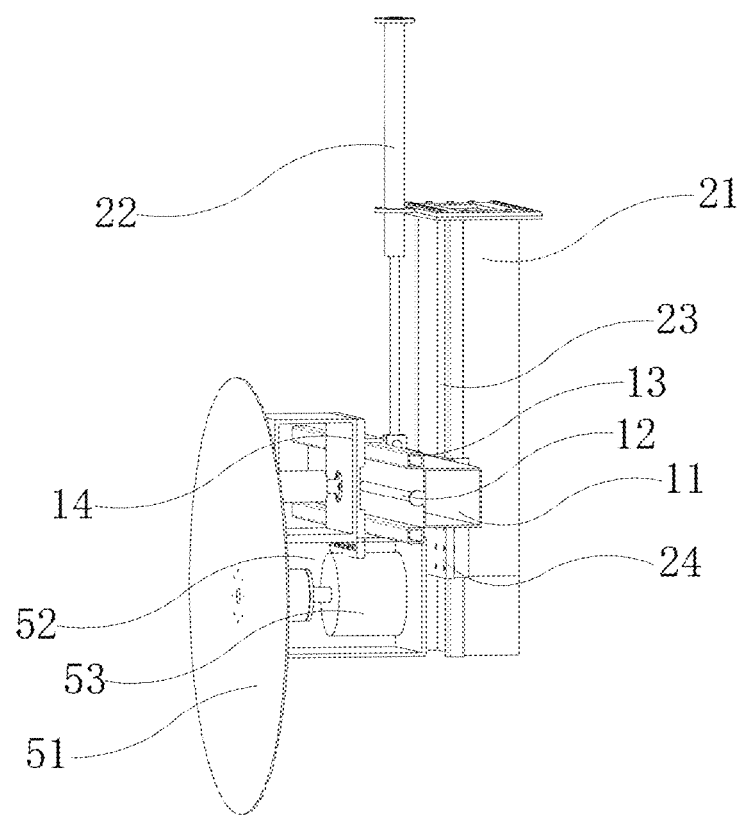
FIG. 4 is a structural schematic diagram of a first type of horizontal driving device and a second type of vertical driving device of the present disclosure.
Figure 6:
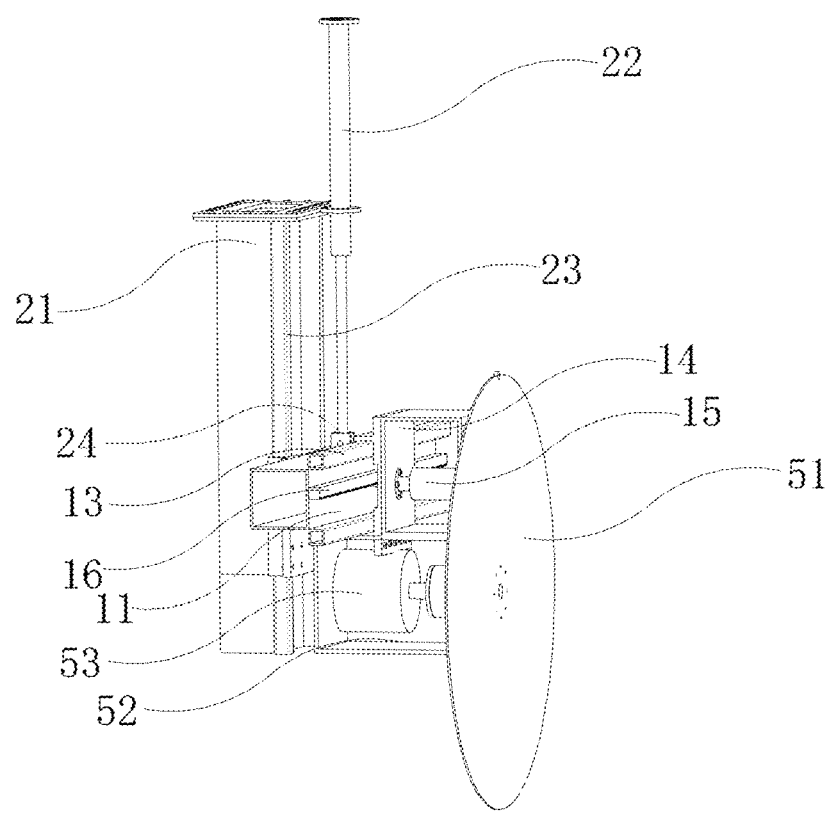
FIG. 6 is a schematic diagram of a second type of horizontal driving device and a second type of vertical driving device of the present disclosure.

Referring to FIG. 2, FIG. 4 and FIG. 6, another type of the vertical driving device 2 is shown, the vertical driving device 2 comprises a vertical driving oil cylinder 22, a vertical sliding rail 23 and a vertical sliding block 24, the vertical sliding rail 23 comprises two vertical sliding rails, and the two vertical sliding rails 23 are respectively arranged on the middle plates of horizontal support 42 on both sides of the supporting frame 4, the vertical sliding block 24 is located in the middle of the two vertical sliding rails 23 and is slidably arranged along the vertical sliding rails 23; the vertical driving oil cylinder 22 is arranged on the top supporting plate 41 of the supporting frame 4, and the end of the oil rod of the vertical driving oil cylinder 22 is fixedly connected with the top of the vertical sliding block 24, the horizontal driving device 1 is arranged at the bottom of the vertical driving sliding block. This mounting means is configured with a normally hollow supporting frame 4, the vertical sliding rail 23 and the sliding block are arranged in the supporting frame 4, and the length of the supporting frame 4 is superimposed on the driving path of the vertical driving device 2. While completing the vertical position adjustment, it also ensures the height of the equipment, the height of the equipment is shortened, the center of gravity of the shorter equipment is lower, the center of gravity is lower, the stability is improved, the stability of the overall structure is improved, the quality of the equipment is better, and the practical life is longer. The two types of vertical driving devices 2 both use a vertically fixed vertical driving oil cylinder 22 to drive the horizontal driving device 1 to move vertically along the vertical driving sliding rail.

According to the above-mentioned two types of vertical driving devices, the horizontal driving device 1 is also provided with two types. Referring to FIG. 3 and FIG. 4, a first embodiment of the horizontal driving device 1 is shown, the horizontal driving device 1 comprises a horizontal mounting frame 11, a horizontal driving oil cylinder 12, a horizontal driving sliding rail 13 and a horizontal driving sliding block 14. The horizontal mounting frame 11 is fixed at a bottom of the vertical driving device 2, and the horizontal driving sliding rails 13 are located on both sides of the horizontal mounting frame 11, the horizontal driving oil cylinder 12 is arranged in the middle of the horizontal mounting frame 11, the horizontal driving sliding block 14 is fixed on the oil rod of the horizontal driving oil cylinder 12 and is clamped on two horizontal driving sliding rails 13, and is arranged to slide in cooperation with the two horizontal driving sliding rails 13, and the cutting device 5 is fixed on the horizontal driving sliding block 14. The movement process of this type of horizontal driving device 1 is: the horizontal driving oil cylinder 12 arranged on the horizontal mounting frame 11 is arranged horizontally; after the horizontal driving oil cylinder 12 is started, the cutting device 5 on the rod of the horizontal driving oil cylinder 12 is fixed on the horizontal driving sliding block 14 at the same time; when the oil rod of the horizontal driving oil cylinder 12 extends, the cutting device 5 slides laterally along the horizontal driving sliding rail 13 to adjust the position of the cutting device 5 in the horizontal direction. The cutting device 5 is driven laterally by an oil cylinder, which has a simple structure and large driving force. A waterproof oil cylinder can also achieve a waterproof effect, so that the cutting device 5 can adapt to different environments and can work in different environments.

Referring to FIG. 5 and FIG. 6, a second embodiment of the horizontal driving device 1 is shown, the horizontal driving device 1 includes a horizontal mounting frame 11, a horizontal driving motor 15, a horizontal driving gear, a horizontal driving rack 16, a horizontal driving sliding rail 13 and a horizontal driving sliding block 14, the horizontal mounting frame 11 is fixed at the bottom of the vertical driving device 2, the horizontal driving sliding rails 13 are located on both sides of the horizontal mounting frame 11, and the horizontal driving rack 16 is arranged in the middle of the horizontal mounting frame 11, the horizontal driving motor 15 is vertically fixed on the horizontal sliding block, and the horizontal driving gear is arranged on a motor shaft of the horizontal driving motor 15, the horizontal driving gear meshes with the horizontal driving rack 16, the horizontal driving sliding block 14 is clamped on two horizontal driving sliding rails 13, and is slidably arranged in cooperation with the two horizontal driving sliding rails 13, and the cutting device 5 is fixed on the horizontal driving sliding block 14. This type of horizontal driving device 1 uses rack and pinion instead of cylinders for lateral movement, and the driving process is as follows: starting the horizontal driving motor 15, the horizontal driving motor 15 rotates, and drives the horizontal driving gear set on the motor shaft to rotate, the horizontal driving rack 16 meshing with the horizontal driving gear is arranged horizontally, so that the horizontal driving motor 15 drives the horizontal driving gear to move horizontally along the horizontal driving sliding rail 13 through the horizontal driving sliding block 14. The motor drives the rack and the gear to move laterally, which reduces the setting of the negative pressure device relative to the oil cylinder, and the meshing of the rack and pinion is more stable and the waterproof performance is better. While realizing the horizontal drive, it also reduces the production cost as much as possible.

Figure 11:
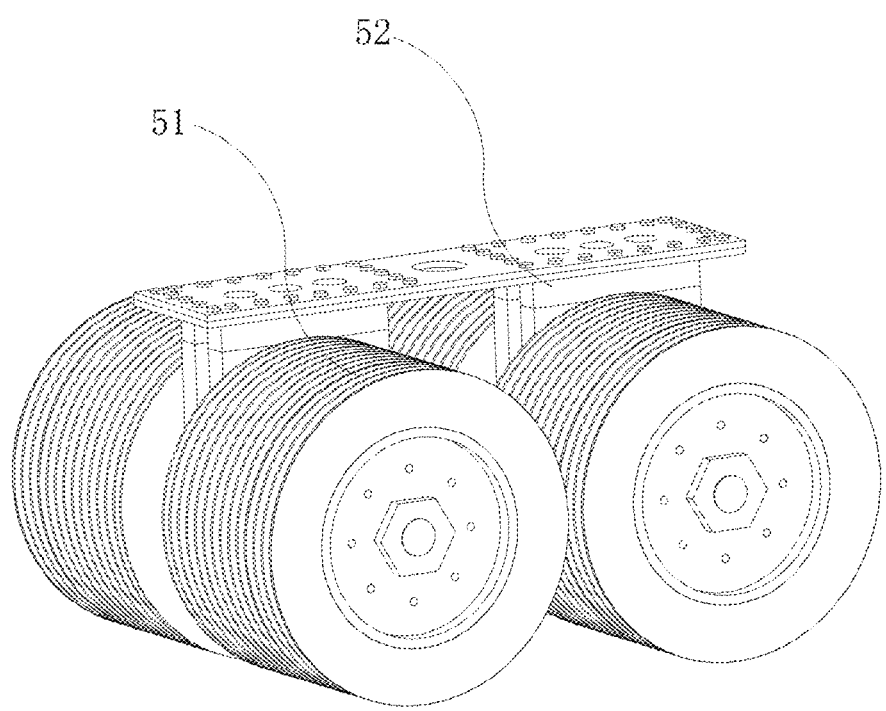
FIG. 11 is a schematic diagram of a cutting device of a plurality of cutting tools of the present disclosure.

Referring to FIG. 1, FIG. 11, the cutting device 5 includes a cutting tool 51, a tool mounting frame 52 and a cutting driving motor 53, the tool mounting frame 52 is fixed on the horizontal driving sliding block 14, and the cutting tool 51 is rotatably arranged on the tool mounting frame 52 through a tool mounting shaft, the cutting driving motor 53 drives the tool mounting shaft to rotate on the tool mounting frame 52; a plurality of the cutting tools 51 are provided, one or more tools on the cutting tool holder can be provided according to different cutting requirements. At the same time, two groups of cutting tools 51 can be provided, and the two cutting tools 51 are respectively arranged in parallel on both sides of the supporting frame 4, when the two cutting devices 5 are set, the vertical mounting frame 21 or the vertical sliding block 24 needs to be set in the middle of the supporting frame 4. One vertical driving oil cylinder 22 is provided on each side of the vertical mounting frame 21 or the vertical sliding block 24, two vertical driving oil cylinders 22 respectively drive two horizontal driving devices 1 and two sets of cutting tools 51 arranged at the bottom of the two horizontal driving devices 1 to cut. The two sets of cutting tools 51 can be driven synchronously or individually to improve cutting efficiency.

Referring to FIG. 7, the verticality detection device 3 includes a verticality detection component and a sensor 36, the verticality detection component and the sensor 36 are both arranged on the vertical support 43 of the supporting frame 4, a plurality of the verticality detection components are provided, and the plurality of the verticality detection components are movably mounted on sides of four vertical supports 43 of the supporting frame 4. The cutting project of the cavity and the ground such as the diaphragm wall often requires construction tools such as a cutting machine, when using a cutting machine to cut, it is necessary to manually measure the verticality and flatness of the wall before each step of cutting, and then determine the position and depth of the cutting. Although manual measurement can judge the cutting position, the commonly used measuring instruments are relatively simple, cumbersome to use, and having low measurement accuracy, it is difficult to measure multiple times during the work process. Therefore, when the verticality detection device 3 is used instead of the manual measurement device to measure the wall, the manual operation time can be greatly reduced, and the automated verticality detection device 3 can not only achieve accurate measurement results, but also perform multiple measurements easily and quickly, improve the detection accuracy and detection efficiency, thereby improving the construction quality and efficiency.

Figure 9:
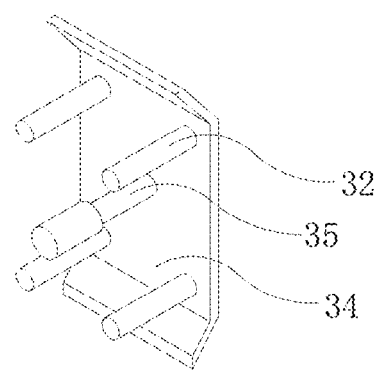
FIG. 9 is a structural schematic diagram of an auxiliary detection support of a verticality detection device of the present disclosure.
Figure 10:
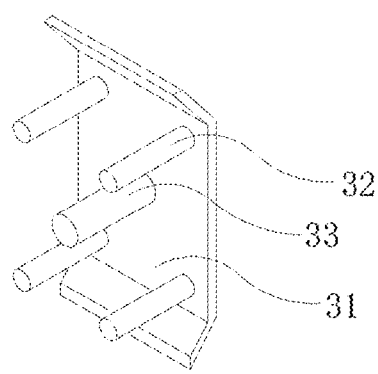
FIG. 10 is a structural schematic diagram of an adjustment detection support of a verticality detection device of the present disclosure.

Referring to FIG. 9 and FIG. 10, the verticality detection component comprises an adjustment detection support and an auxiliary detection support, two adjustment detection supports are provided on each column of verticality detection components, the two adjustment detection supports are respectively located at an upper end and a lower end of the supporting frame 4, and auxiliary support devices for auxiliary are provided on both sides of the adjustment detection support. The adjustment detection support set at both ends can adjust the distance of the wall that the vertical detection component can touch, making it easier for the vertical detection component to touch the wall, in addition, arranging adjustable adjustment detection supports at different positions can detect uneven wall surfaces, the vertical detection device can be in contact with different positions of the wall surface, thereby detecting the flatness of the wall surface. For walls with different accuracy requirements and different areas, different numbers and different positions of the adjustment detection support and auxiliary detection support can be arranged.

The auxiliary detection support includes an auxiliary detection board 31, a sliding shaft 32 and a movable mounting shaft 33, and the auxiliary detection board 31 is mounted on the supporting frame through the sliding shaft 32 and the movable mounting shaft 33; the adjustment support includes an adjustment detection board 34, a sliding shaft 32 and an detection oil cylinder 35, and the adjustment detection board 34 is arranged on the supporting frame through the detection oil cylinder 35 and the sliding shaft 32. The movable mounting shaft 33 is located in the middle of the auxiliary detection board 31 and is used for fixing the middle of the auxiliary detection board 31, and the sliding shafts 32 located at two ends of the auxiliary detection board 31 are used for the sliding support at the two ends of the auxiliary detection board 31; the detection oil cylinder 35 is located in the middle of the adjustment detection board 34 and is used to adjust the mounting distance between the adjustment detection board 34 and the supporting frame 4, and the sliding shafts 32 located at two ends of the adjustment detection board 34 are used for the sliding support at both ends of the adjustment detection board 34; the sensor 36 is located on the sliding shaft 32 and is used for sensing the sliding distance of the auxiliary detection board 31 or the adjustment detection board 34 on the corresponding sliding shaft. The detection process of the vertical detection component is: firstly, the verticality detection device 3 is arranged on a machine such as a grooving machine, and the grooving machine drives the detection surface of the vertical detection device to get close to the wall. The detection oil cylinder 35 arranged on the support frame 4 is activated, and the detection oil cylinder 35 drives the adjustment supporting plate on the detection oil cylinder 35 to be close to the wall, and due to the unevenness and inclination of the wall, the plane of the adjustment supporting plate cannot be completely attached to the wall. Therefore, the adjustment supporting plate will press one end of the adjustment support plate to slide along the sliding rod along with the inclination of the wall surface until the adjustment supporting plate is parallel to the wall. At this time, the inclination in the front can be determined by adjusting the distance that the supporting plate slides on the sliding rod. The auxiliary detection support assists the adjustment detection support beside the adjustment detection support, as above, for adjusting the inclination and flatness of the wall at the contact position.

The above is a detailed description of the preferred implementation of the present disclosure, but the creativeness of the present disclosure is not limited to the described embodiments. Those skilled in the art can make various equivalent modifications or substitutions without departing from the spirit of the present disclosure, and these equivalent modifications or substitutions are all included in the scope defined by the claims of this application.

The invention claimed is:

1. A full-hydraulic automatic diaphragm wall cutting-grooving machine, comprising a supporting frame, a cutting device, a cutting driving device and a vertically detection device, wherein the verticality detection device is arranged on a side of the supporting frame, and is used to detect the verticality and flatness of the full-hydraulic automatic diaphragm wall during the cutting process, the cutting device is arranged at a bottom of the supporting frame and is used to drive the supporting frame and an equipment arranged on the supporting frame to move and cut, the cutting driving device is arranged on the cutting device and is used to drive and adjust the cutting device in different directions;

wherein the supporting frame comprises a top supporting plate, and a horizontal support and a vertical support arranged below the top supporting plate, both the horizontal support and the vertical support set to two layers, wherein the vertical support comprises four external mounting plates and four internal fixing plates, vertically arranged at a bottom of the top supporting plate, and wherein the external mounting plates and the internal fixing plates are arranged in parallel, the external mounting plates are configured for installment of the verticality detection device, and the internal fixing plates are used for auxiliary fixing.

2. The full-hydraulic automatic diaphragm wall cutting-grooving machine of claim 1 the supporting frame enclosed by the vertical support and the horizontal support is hollow, four corners of the supporting frame are each provided with one vertical support, and the horizontal support and the vertical support are arranged perpendicular to each other, and wherein the horizontal support, comprises three rows of plates, the three rows of plates refer to end horizontal supporting plates arranged at two ends of the vertical support and a middle horizontal supporting plate arranged at a middle position of the vertical support, and the end horizontal supporting plates and the middle horizontal supporting plate are arranged in parallel.

3. The full-hydraulic automatic diaphragm wall cutting-grooving machine of claim 1, wherein the top supporting plate comprises an edge part arranged on the horizontal support and a central part arranged in a middle of the edge part; wherein, the top supporting plate is further provided with a frame connection component, and a top mounting block is located in a middle of the central part, a mounting screw is further arranged in the top mounting block, and the mounting screw is vertically arranged on the top mounting block.

4. The full-hydraulic automatic diaphragm wall cutting-grooving machine of claim 3, wherein, the cutting driving device comprises a horizontal driving device and a vertical driving device, the cutting device is arranged on the horizontal driving device and is driven by the horizontal driving device, and the horizontal driving device is arranged on the vertical driving device and is driven by the vertical driving device.

5. The full-hydraulic automatic diaphragm wall cutting-grooving machine of claim 4, wherein, the vertical driving device comprises a vertical mounting frame, a vertical driving oil cylinder, a vertical sliding rail and a vertical sliding block, the vertical driving oil cylinder and the vertical mounting frame are both mounted at the bottom of the supporting frame; wherein the vertical sliding rails is arranged on the mounting frame, and the vertical sliding block is slidably arranged in a pushing direction of the vertical oil cylinder in cooperation with the vertical sliding rail; wherein the horizontal driving device is fixedly arranged on an end of an oil rod of the vertical driving oil cylinder and the vertical sliding block.

6. The full-hydraulic automatic diaphragm wall cutting-grooving machine of claim 4, wherein, the vertical driving device comprises a vertical driving oil cylinder, a vertical sliding rail and a vertical sliding block, the vertical sliding rail is configured as two vertical sliding rails respectively arranged on the middle horizontal supporting plates on both sides of the supporting frame, the vertical sliding block is located in the middle of the two vertical sliding rails and is slidably arranged along the vertical sliding rails; wherein the vertical driving oil cylinder is arranged on the top supporting plate of the supporting frame, and the end of the oil rod of the vertical driving oil cylinder is fixedly connected with the top of the vertical sliding block, the horizontal driving device is arranged at the bottom of the vertical sliding block.

7. The full-hydraulic automatic diaphragm wall cutting-grooving machine of claim 5, wherein, the horizontal driving device comprises a horizontal mounting frame, a horizontal driving oil cylinder, a horizontal driving sliding rail and a horizontal driving block, the horizontal mounting frame is fixed at a bottom of the vertical driving device, and the horizontal driving sliding rails are located on both sides of the horizontal mounting frame, the horizontal driving oil cylinder is arranged in a middle of the horizontal mounting frame, the horizontal driving sliding block is fixed on an oil rod of the horizontal driving oil cylinder while being clamped on two horizontal driving sliding rails, and arranged to slide in cooperation with the two horizontal driving sliding rails, and the cutting device is fixed on the horizontal driving sliding block; or, the horizontal driving device comprises a horizontal mounting frame, a horizontal driving motor, a horizontal driving gear, a horizontal driving rack, a horizontal driving sliding rail and a horizontal driving block, the horizontal mounting frame is fixed at the bottom of the vertical driving device, the horizontal driving sliding rails are located on both sides of the horizontal mounting frame, and the horizontal driving rack is arranged in the middle of the horizontal mounting frame, the horizontal driving motor is vertically fixed on the horizontal sliding block, and the horizontal driving gear is arranged on a motor shaft of the horizontal driving motor, the horizontal driving gear meshes with the horizontal driving rack, the horizontal driving sliding block is clamped on two horizontal driving sliding rails and slidably arranged in cooperation with the two horizontal driving sliding rails, and the cutting device is fixed on the horizontal driving sliding block.

8. The full-hydraulic automatic diaphragm wall cutting-grooving machine of claim 7, wherein, the cutting device comprises a cutting tool, a tool mounting frame and a cutting driving motor, the tool mounting frame is fixed on the horizontal driving sliding block, and the cutting tool is rotatably arranged on the tool mounting frame through a tool mounting shaft, the cutting driving motor drives the tool mounting shaft to rotate on the tool mounting frame; wherein a plurality of the cutting tools are provided.

9. The full-hydraulic automatic diaphragm wall cutting-grooving machine of claim 3, wherein, the verticality detection device comprises a verticality detection component and a sensor, the verticality detection component and the sensor are both arranged on the vertical support of the supporting frame, a plurality of the verticality detection components are provided and movably mounted on sides of four vertical supports of the supporting frame.

10. The full-hydraulic automatic diaphragm wall cutting-grooving machine of claim 9, wherein, the verticality detection component comprises an adjustment detection support and an auxiliary detection support, two adjustment detection supports are provided on each column of verticality detection components, the two adjustment detection supports are respectively located at an upper end and a lower end of the supporting frame, and auxiliary support devices for auxiliary are provided on both sides of the adjustment detection support; wherein, the auxiliary detection support comprises an auxiliary detection board, a sliding shaft and a movable mounting shaft, and the auxiliary detection board is mounted on the supporting frame through the sliding shaft and the movable mounting shaft; wherein the adjustment support comprises an adjustment detection board, a sliding shaft and an oil cylinder, and the adjustment detection board is arranged on the supporting frame through the oil cylinder and the sliding shaft.

11. The full-hydraulic automatic diaphragm wall cutting-grooving machine of claim 10, wherein, the movable mounting shaft is located in the middle of the auxiliary detection board and is used for fixing the middle of the auxiliary detection board, and the sliding shafts located at two ends of the auxiliary detection board are used for the sliding support at the two ends of the auxiliary detection board; wherein the oil cylinder is located in the middle of the adjustment detection board and used to adjust the mounting distance between the adjustment detection board and the supporting frame, and the sliding shafts located at two ends of the adjustment detection board are used for the sliding support at both ends of the adjustment detection board; wherein the sensor is located on the sliding shaft and used for sensing the sliding distance of the auxiliary detection board or the adjustment detection board on the corresponding sliding shaft.

\* \* \* \* \*